(12) United States Patent
Cobb et al.

(10) Patent No.: US 9,944,210 B2
(45) Date of Patent: Apr. 17, 2018

(54) AUTO CALIBRATION FOR BIN POSITION SENSOR

(71) Applicant: DEERE & COMPANY, Moline, IL (US)

(72) Inventors: Codie J. Cobb, Davenport, IA (US); Shawn W. Faris, LeClaire, IA (US); Jose M. Martinez, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 79 days.

(21) Appl. No.: 15/095,408

(22) Filed: Apr. 11, 2016

(65) Prior Publication Data

US 2017/0291525 A1 Oct. 12, 2017

(51) Int. Cl.
*B60P 1/04* (2006.01)
*G01D 5/14* (2006.01)

(52) U.S. Cl.
CPC ............ *B60P 1/04* (2013.01); *G01D 5/142* (2013.01)

(58) Field of Classification Search
CPC . B60P 1/04; G01D 5/142; E02F 9/264; G12B 13/00
USPC .................................. 701/49, 50, 1; 702/85
See application file for complete search history.

(56) References Cited

U.S. PATENT DOCUMENTS

| 7,392,687 B2 | 7/2008 | Huang et al. |
| 7,918,158 B2 | 4/2011 | Viaud |
| 2007/0260380 A1* | 11/2007 | Mintah ............... E02F 9/264 701/50 |
| 2011/0301781 A1 | 12/2011 | Karlsson |
| 2013/0115031 A1* | 5/2013 | Trame ............... B65G 65/466 414/307 |
| 2014/0165692 A1 | 6/2014 | Rannow |
| 2016/0281334 A1* | 9/2016 | Iwamura ............... E02F 3/32 |

\* cited by examiner

*Primary Examiner* — Marthe Y Marc-Coleman
(74) *Attorney, Agent, or Firm* — Taft Stettinius & Hollister LLP; Stephen F. Rost

(57) ABSTRACT

A method and system to control movement of a dump bin for a dump vehicle having a frame. The dump bin is configured to move through a range of angular positions with respect to the frame, wherein the range of angular positions includes a bin down position at one end of the range and a bin up position at the other. An angular sensor generates angular position information throughout the range of angular positions. An automatic calibration is made at the bin down position and at the bin up position to account for changes to the system caused by sensor drift or mechanical deformation of the dump vehicle and its various parts. By continuous adjustment of the bin positions using the calibrated positions, false positives of the bin alarm are reduced, bin height restrictions are avoided, engine derating is reduced, and float mode is more accurately controlled.

20 Claims, 3 Drawing Sheets

//AUTO CALIBRATION FOR BIN POSITION SENSOR

FIELD OF THE DISCLOSURE

The present invention generally relates to a dump truck, and more particularly to a control system configured to control a vertical position of a bin of the dump truck.

BACKGROUND

Dump trucks include an articulated dump body, or dump bin, which is moved between a down position and an up position to provide for the transportation of a material from one location to another. The transported material can include a fluid, a solid material, and aggregates of the same material or different materials. Most generally aggregates of materials are transported in a dump truck, since the aggregates tend to flow relatively easily from the articulated bin when one end is elevated with respect to another end. The articulated bin typically includes bin lift cylinders positioned such that the force exerted by the cylinders moves the bin from a generally horizontal position to an inclined position with respect to the horizontal position. Other dump truck designs use multi-stage lift cylinders to take advantage of the fact that decreasing force is required as lift increases. A multi-stage cylinder at an initial extension provides a high force at low speed. As the cylinder extension continues and the additional stages are activated, speed increases and force decreases. Thus, faster bin raise times are realized.

In one embodiment of a known dump truck, the dump bin is inclined during movement of the bin with respect to a frame of the vehicle. The bin is moved from a relatively horizontal position (negative three degrees in one embodiment with respect to the frame) to a maximum tipping angle of approximately seventy degrees with respect to the frame during the bin dumping operation.

In these and other types of dump trucks, the dump bin position relative to the vehicle frame is measured using a rotary sensor. In one embodiment, the rotary sensor is a rotary Hall-effect sensor. To determine the relative position of the dump body with respect to the vehicle frame, a vehicle control unit, or electronic control unit, records the sensor output values at two specific points along the sensor range—a dump bin up position and a dump bin down position. The measured up value and the measured down value determine a resulting electrical range which can be used in determining the dump bin position between generally horizontal position and the maximum inclined position. This process requires an operator to verify the dump bin is positioned at a maximum downward position or at a maximum upward position. External forces acting on the system can lead to a shift in the values defining the electrical range which, in turn, defines the dump bin position. The dump bin position, as interpreted by the vehicle control unit, can consequently be inaccurate or incorrect, which necessitates a recalibration by a vehicle technician.

What is needed therefore is a dump bin position sensor system with provides an accurate calibration or recalibration procedure which is made without significant operator or technician intervention.

SUMMARY

In one embodiment, there is provided a method for calibrating a range of angular positions of a dump bin of a dump vehicle wherein the dump vehicle includes a bin angle adjustment device which moves the dump bin through the range of angular positions. The bin angle adjustment device is configured have an OFF state and an ON state, and an angle sensor is configured to generate a plurality of angle values indicative of the angular positions. The method includes: querying the angle adjustment device to determine if the angle adjustment device is in the ON state; querying the angle sensor to receive generated angle values; recording a first one of the received angle values if the angle adjustment device is in the ON state and the received angle values are stable over a predetermined period of time; and calibrating the range of angular positions as a function of the recorded first one of the received angle values.

In another embodiment, there is provided a method for calibrating a range of angular positions of a dump bin of a dump vehicle wherein the dump bin is configured to move through the range of angular positions between a first end position and a second end position. The method includes: monitoring the angular positions of the dump bin while the dump bin moves between the first end position to the second end position; detecting when the angular position remains constant at one of the first end position and the second end position; identifying a first value of the detected one of the first end position and the second end position; establishing a first endpoint of the range of angular positions as a function of the identified first value; and calibrating the range of angular positions with the established first endpoint.

In still another embodiment, there is provided a control system for a vehicle having a frame and a dump bin configured to angularly move in a range of angular positions with respect to the frame. The range of angular positions includes a bin down position at one end of the range and a bin up position at the other end of the range. The control system includes a bin angle adjustment device configured to provide a bin angle output to move the dump bin in the range of angular positions with respect to the frame. A display is configured to display values corresponding to the range of angular positions. An angle sensor is configured to provide a plurality of sensed angle values indicative of the angular positions of the dump bin with respect to the frame. Control circuitry is operatively connected to: i) the bin angle adjustment device, ii) the display, and iii) the angle sensor, wherein the control circuitry is configured to move the dump bin between the bin down position to the bin up position in response to the provided bin angle output. Storage is operatively connected to the control circuitry and is configured to store a software component, wherein the software component is configured to determine when the sensed angle value remains constant at the same time as the bin angle adjustment device is providing the bin angle output.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
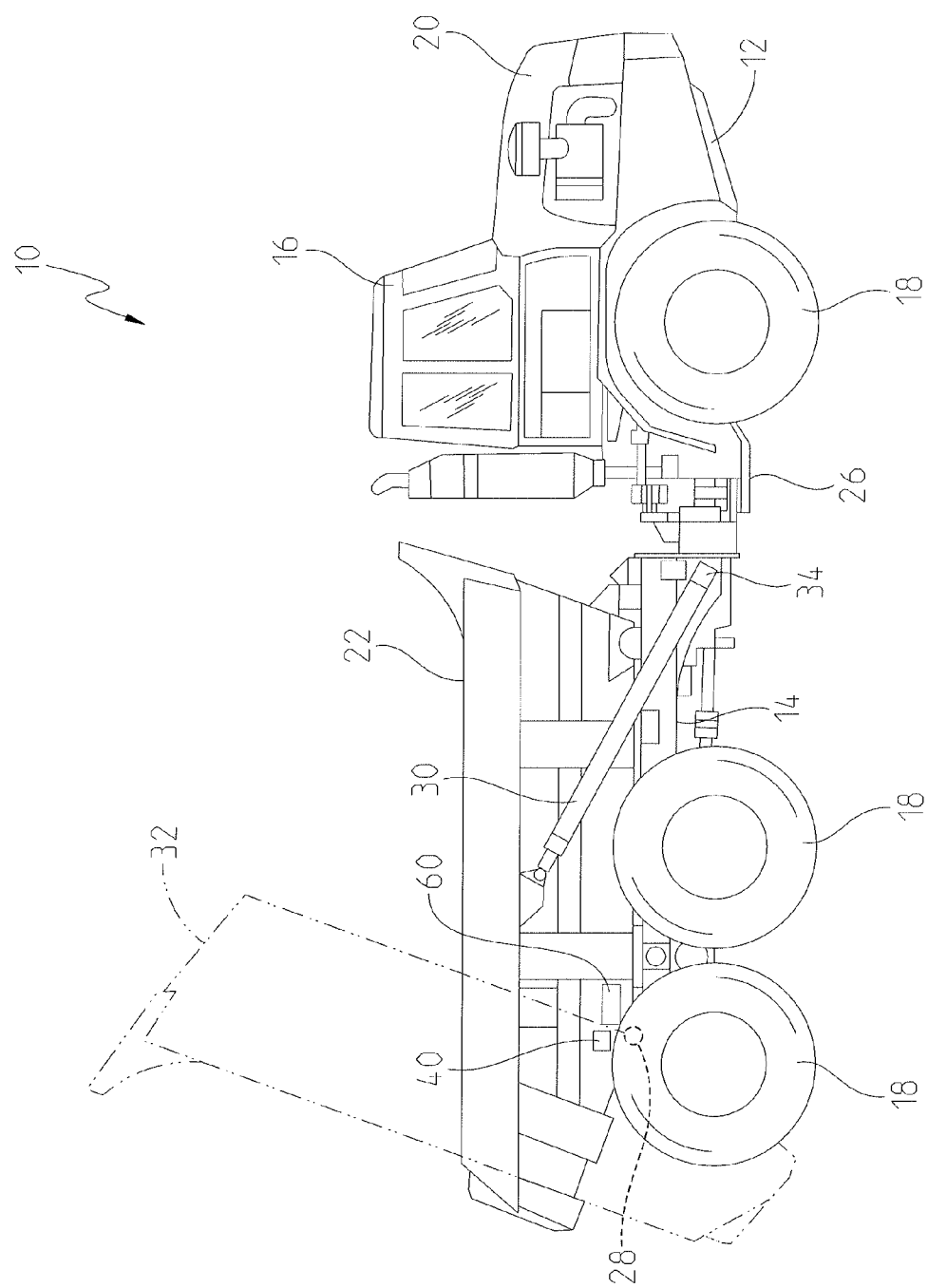
FIG. 1 is a side elevational view of an articulated dump truck showing a bin in a loading portion in solid line and the bin in a raised position in broken line.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

FIG. 1 is a side elevational view of an articulated dump truck 10 including an articulated frame having front and rear frame sections 12 and 14, respectively. An operator cabin 16 is supported by the frame section 12 and a plurality of drive wheels 18 move the dump truck 10 over the ground or other surface. An engine (not shown) is located within an engine compartment 20 to power operation of the dump truck 10, and a dump body or bin 22 for holding material to be hauled is supported by the frame 14. The front and rear frame sections 12 and 14 are pivotally coupled to each other through an articulation joint 26.

The bin 22 is mounted to a rear region of the rear frame section 14 for pivoting about a horizontal transverse axis defined by right and left coupling pin assemblies 28. First and second, single stage bin lift cylinders are located on either side of the bin 22. First cylinder 30 is shown and the other cylinder is provided at an opposite side of the rear frame section 14. Each of the cylinders 30 includes a head end pivotally coupled, for instance, at a pin 34 illustrated for the first cylinder 30. The pin 34 is coupled to a lower front region of the rear frame section 14 and includes a rod end coupled at a pin 36, to an upper central region of the bin 22. When the lift cylinders are in a fully retracted position, the bin 22 is in a completely lowered loading position wherein a bottom of the bin overlies and is supported by the rear frame section 14, as shown in FIG. 1. When the lift cylinders are fully extended, the bin 22 is pivoted upwardly about the coupling assembly 28 so that the bottom of the bin 22 makes a tipping angle of approximately seventy (70) degrees with respect to the horizontal at a position 32 in which the bin 22 is illustrated in dotted outline. A position sensor 40 is located adjacently to or at the assembly 28 about which the bin 22 rotates. The position sensor 40, in one embodiment, is a rotary Hall-effect sensor.

Figure 2:
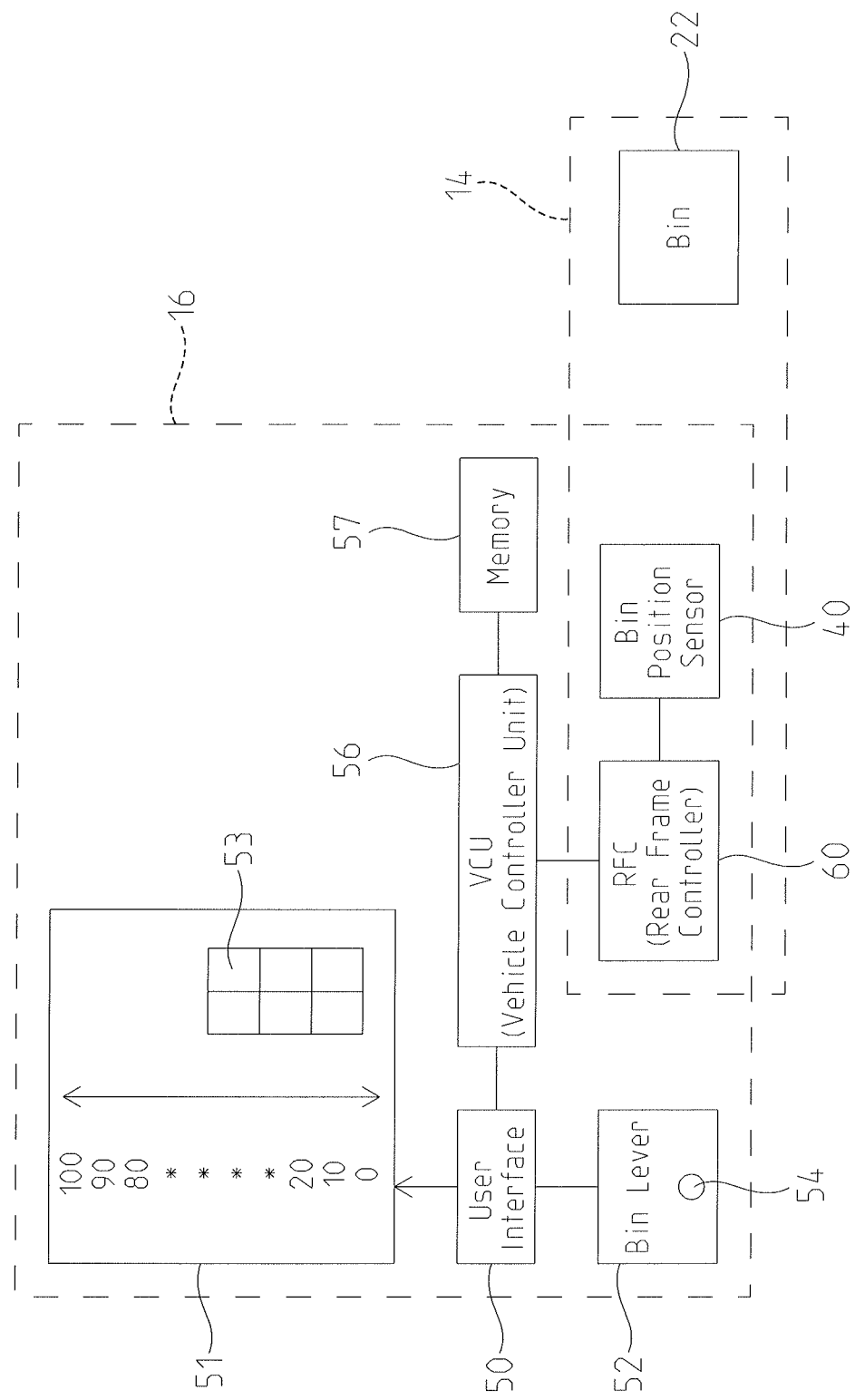
FIG. 2 is a simplified schematic diagram of cabin located components and frame located components.

The operator cabin 16 encloses a seat, a steering wheel, a fuel pedal, and additional pedals for a brake and a clutch (not shown) as is known by those skilled in the art. The cabin 16 further includes, as illustrated in FIG. 2, a user interface 50 disposed in the cabin 16 at a location accessible to the operator when seated. The user interface 50 includes a display screen 51, illustrated in more detail, which includes a plurality of operator selectable buttons 53 configured to enable the operator to control the operation and function of the tractor 10. In different embodiments, the user interface 50 and the display screen 51 are configured as a single device or as separated devices. In one embodiment, the display screen 51 includes a plurality of user selectable buttons 53 to select from a plurality of commands or menus, each of which are selectable through a touch screen which can include the display screen 51 or be separate therefrom. In another embodiment, the user interface 50 includes a plurality of mechanical push buttons as well as a touch screen. In another embodiment, the user interface includes a display screen and only mechanical push buttons.

Movement of the dump body is controlled by a bin control lever 52, also described as a bin angle adjustment device, which includes a button 54. In one embodiment, the bin lever 52 includes a joystick lever upon which the button 54 is located. Movement of the joystick 52 moves the bin 22 between the end positions of completely down and fully elevated. In one embodiment, forward movement of the lever 52, away from the operator, raises the bin 22 with respect to the frame 14. Rearward movement of the lever 52, toward the operator, lowers the dump bin 22. While a joystick control is described, other embodiments include other mechanisms of moving the dump bin 22.

The user interface 50 and the bin lever 52, including the button 54, are operatively connected to a vehicle control unit (VCU) 56 which is generally located within the cabin 16 in one embodiment. Other locations of the VCU 56 within the tractor 10 are possible. The VCU 56, in different embodiments, includes control circuitry, a controller, a computer, computer system, or programmable devices, e.g., multi-user or single-user computers. In other embodiments, the VCU 56 includes one or more processors (e.g. microprocessors), and an associated internal memory including random access memory (RAM) devices comprising the memory storage of the VCU 56, as well as any supplemental levels of memory, e.g., cache memories, non-volatile or backup memories (e.g. programmable or flash memories), read-only memories, etc. A memory 57, external to the VCU 56, is illustrated. In addition, the memory 57 can include a memory storage physically located elsewhere from the processing devices and can include any cache memory in a processing device, as well as any storage capacity.

As described herein, various functions provided by the controller VCU 56 include, in different embodiments, hardware devices, software applications, or a combination of both hardware devices and software applications. The controller VCU 56 is configured to execute or otherwise rely upon computer software applications, components, programs, objects, modules, or data structures, etc. Software routines resident in the included memory, other external memory (not shown), or provided as firmware, are executed in response to the various signals received and generated as described herein. The executed software includes one or more specific applications, components, programs, objects, modules or sequences of instructions typically referred to as "program code". The program code includes one or more instructions located in the memory, other storage devices or elsewhere, which executes the control functions of the vehicle 10.

The user interface 50 and bin lever 52 are both electrically coupled to the VCU 56 either through wireless connections or through hardwire connections. The VCU 56 is also electrically coupled to a rear frame controller (RFC) 60 which is located in the rear frame 14. In another embodiment, the RFC 60 is located in the cab 16 or at another location in the vehicle. In still other embodiments, the functions of the RFC 60 are incorporated in the VCU 56, such that a separate RFC 60 is not required. In still further embodiments, the various functions of the VCU 56 and the RFC 60 are distributed to a variety of controllers located within the cabin 16 or elsewhere.

The RFC 60 is operatively coupled to the bin position sensor 40 and is configured to receive output signals provided by the sensor 40 indicative of the angle at which the bin 22 is positioned. In one embodiment, the sensor 40 is a Hall-effect sensor which includes a rotor configured to rotate about a rotational axis and past a number of Hall-effect devices configured to sense the rotational angle of the rotor. An electrical output signal of the Hall-effect device is provided to the RFC 60 which transmits a position signal derived from the output signal of the sensor 40 to the VCU 56. In one embodiment, the output of the signal of the sensor 40 is continuous and the VCU 56 continuously monitors the position of the bin 22. In other embodiments, the output of the sensor is discontinuous, but angle signals transmitted to the VCU 56 are provided in a timely fashion to provide a relatively accurate angle location of the bin 22. The position signal includes sufficient position data which the VCU 56 configures for display on the display 51. In one embodiment, the display 51 displays numerical values of the current angular position of the bin 22 with respect to a horizontal axis defined at the frame 14. In another embodiment, the angular position of the bin 22 is displayed as a percentage of from zero to one-hundred percent, where zero is equivalent to the substantially horizontal position and one-hundred percent is equivalent to the most inclined position, which in the describe embodiment is seventy degrees with respect to horizontal. The operator views the percentage values to determine the angular position of the bin.

While the user interface 50 is configured to display an indicator which provides a current angular position to the operator, the displayed angular position relies on the accuracy of the output signal of the sensor 40. To insure that the sensor 40 provides an accurate angular reading, the sensor 40 is calibrated, when installed or prior to installation. The accuracy of the angular reading, however, not only depends on the accuracy of the sensor 40, but also depends on the physical structure to which the sensor is mounted, as well as the physical condition of the frame 14, the bin 22, the cylinders 30, the coupling assembly 28, and other related structures. Over a period of time, the sensor 40 and each of these structures and conditions changes through use. The angular position provided by the sensor can change and provide inaccurate angular position readings.

To insure that the sensor 40 is providing an accurate determination of angular position, the VCU 56 is configured to automatically reset an electrical range of the sensor 40 which corresponds to a position of the dump body. The VCU 56 continuously monitors conditions of the bin 22 position with respect to a frame 14 of the dump vehicle 10. The VCU 56 automatically calibrates the electrical range, provided by the sensor 40, when certain conditions are met which indicate that a calibration is desirable.

In one embodiment, two conditions are: (1) the position of one or both of the lever 52 and the button 54; and (2) a relatively constant or stable, a sensor output of the sensor 40. For instance, when the bin control lever 52 or button 54 is pressed, the bin 22 moves up or down depending on the direction to which the lever 52 or button 54 is pressed. In another embodiment, the button 54 must be engaged when the lever 54 moves the bin to either extreme position to begin a calibration procedure. If the button is not depressed, then no calibration occurs. In still another embodiment, there is no button 54 and only movement of the lever 52 to either extreme bin position starts a calibration procedure. As the bin 22 motion stops due to contact with the vehicle frame 14, which can occur in either direction, the angular output of the angular sensor 40 is a constant value. In one embodiment, this constant value results from a rotor of the angular sensor stopping its movement, and thus the output of the sensor remains a constant value. To differentiate between the two opposite maximum positions of the dump bed, the controller is configured to compare the recorded values to expected values for a dump body up or a dump body down position. In one embodiment, the stable value is determined if the sensor output value does not change over a predetermined period of time. In one embodiment, the predetermined period of time is longer than the time between when the bin lever button is pushed or is ON, and the bin actually begins to move. This period of time is to avoid automatically calibrating when the lever has just been pushed or is ON, but the bin has not yet moved because of a delay in the system response time.

Figure 3:
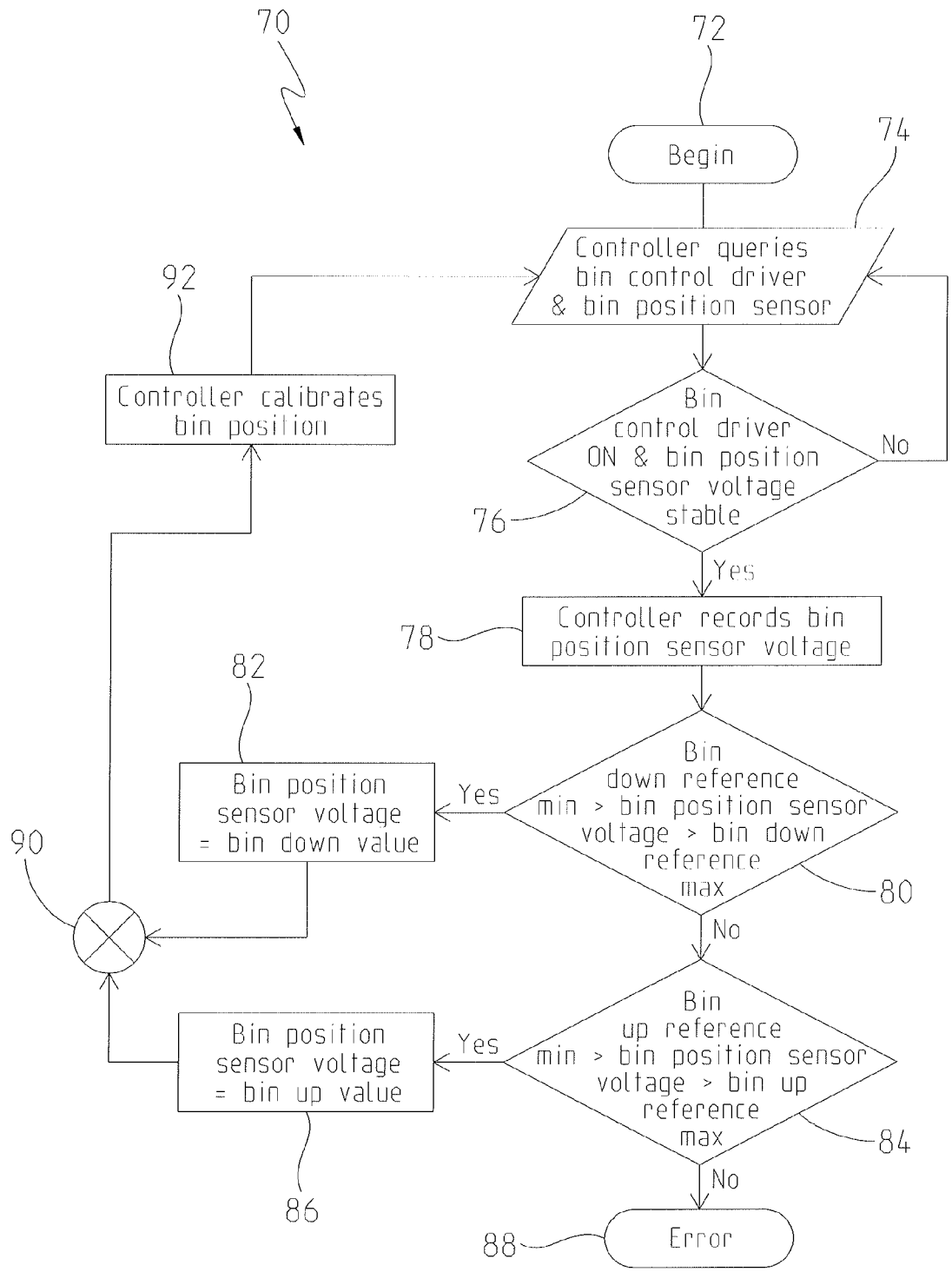
FIG. 3 is a block diagram of a process to calibrate a bin position sensor.

FIG. 3 is a block diagram 70 of a process to automatically calibrate an electrical range, provided by the sensor 40, when certain conditions are met to indicate that a calibration is desirable. The electrical range of the bin position sensor 40, in one embodiment, is typically calibrated at the manufacturer prior to the vehicle first being put into service. For this initial calibration, the present described process to calibrate the electrical range of the bin position sensor 40 can be used. In other embodiments, the initial calibration is performed using a calibration process not described herein, but one or more other calibrations are used.

The VCU 56, identified as a controller in FIG. 3, is configured to calibrate or recalibrate the electrical range provided by the bin position sensor 40. An electrical range for a calibrated bin position sensor is determined for the sensor 40 after being installed in the vehicle 10. In one embodiment, a minimum range of electrical values is determined for the bin 22 being located at the generally horizontal position (bin down position) and a maximum range of electrical valued is determined for the bin being located at maximum inclined position (bin up position). For example, in an initial determination of the range of values for the bin down position, the range is from 3.7 and 4.3 volts. In the bin up position the range of values is from 0.7 and 1.3 volts. Consequently, in this embodiment, if the voltage output values provided by the sensor 40 are between 3.7 and 4.3 volts, the bin 22 is determined to be in the down position. If the voltage output values provided by the sensor 40 are between 0.7 and 1.3 volts, the bin is determined to be in the up position. This result occurs due to the configuration of the sensor as well as the direction in which the sensor is located. In other embodiments, the ranges are reversed such that a range of 0.7 to 1.3 volts is for the pin down position and a range of 3.7-4.3 volts is for a bin up position.

The values of each of the determined ranges depends, however, on the type of sensor being used, the initial calibration values of the sensor itself, and other factors such as the physical configuration of the frame 14, the bin 22, and the cylinders 30. The selected range values are therefore not fixed but determined as a function of among other things, the sensor, the environment in which the sensor is located, and other electrical devices used in combination with the sensor 40. In one embodiment, each of the ranges corresponds to about twenty (20) percent of the range of the entire range of electrical values provided by the sensor 40. In other embodiments, the range corresponds to about ten (10) percent. The range is determined a fraction of the entire range that the sensor travels when installed on the vehicle.

In an initial state, the procedure begins at block 72 of the block diagram 70 of FIG. 3. In one embodiment, the procedure is active once the vehicle 10 is started. In another embodiment, the calibration procedure is not active until the procedure is initiated by the operator through interaction with the user interface 50. The controller 56 monitors a position of the bin control driver 52 as well as the value of the output signal of the sensor 40 at block 74. The movement of the bin control driver 52 to an on position transmits a signal to the controller 56 indicating that the driver 52 has been moved from a neutral or zero position (an off position) in either a first direction or a second direction. In one embodiment, movement of the driver 52 in the first direction indicates a bin up movement of the bin 22. Movement of the driver 52 in the second direction indicates bin down position, opposite the first direction.

In another embodiment, the controller 56 monitors the position of the driver 52 as well as the position of the button 54. Movement of the button 54 from a neutral position provides a signal to the controller 56 to indicate that a calibration of the sensor system is to be made. For instance, movement of the button 54 to a depressed position along with movement of the driver 52 places the controller 56 in calibration mode which is used to determine the accuracy of the current sensor system calibration as well as to update the calibration, if necessary.

At block 76, the controller 56 determines if the driver 52 is ON (displaced from the neutral position) and that an output of the sensor 40 is not stable, that is, the voltage of the sensor 40 is changing indicating that the bin position is changing. If the voltage is not stable, the procedure returns to block 74 wherein the controller 56 continues to query the driver position and the bin position sensor. If, however, the driver 52 is ON and the output voltage of the sensor 40 is stable (not changing), the controller 56 stores the voltage of the sensor 40 in memory or storage 57 at block 78.

In other embodiments, the ON position of the driver 52 is determined in a number of different ways. For instance the following conditions are monitored in one or more embodiments: the position of the driver, pilot pressure of the driver, an electrical output signal of the driver, a hydraulic working pressure provided by the driver, and a load sense pressure is monitored. In these and other embodiments, the condition of an actuator, the driver 52 in the illustrated embodiment, is sensed to determine if the actuator is providing an actuation signal to move the bin.

Once the voltage has been stored, the stored voltage is compared to the predetermined voltage reference range corresponding to the down position of the bin at block 80. If the bin position sensor voltage is between the minimum and maximum values of the range, then the bin position sensor voltage is set equal to a bin down voltage value at block 82. If the bin position sensor voltage is determined at block 80 to not be within the predetermined range, then the bin position sensor voltage is compared to the predetermined voltage reference range corresponding to the up of the bin at block 84. If this value is within the range at block 84, then the bin position sensor voltage is set equal to a bin up voltage value at block 86. As described above, the bin down range of values is from 0.7 volts to 1.3 volts and the bin up position range of values is from 3.7 to 4.3 volts.

Once both of the new bin down value of block 82 and the bin up value of block 86 are determined, the two values stored in the memory 57, here indicated by a junction 90. Once stored, the controller 56 calibrates the electrical range of the output of the sensor 40 at block 92. Once calibrated the controller 56 queries the bin control driver and the bin position sensor at block 74.

Once the bin down value and the bin up values are determined, each of the values is used as an endpoint for a linear interpolation made by the controller 56, and in particular a linear interpolation software component stored in memory. The result of the linear interpolation therefore provides a range of voltage values which are used to assign bin positions between the bin down position and the bin up position. The voltage range is converted to the percentage values and displayed for the operator at display screen 51.

In one embodiment, the calibrated bin position information is used to set restrictions that limit the range of bin positions. For instance, under some conditions an inclined position of no more than sixty degrees from horizontal is set to prevent the bin from moving past the predetermined angular location. Such restrictions depend on the bin position as determined by the controller. In still another embodiment, the bin position is used by the controller 56 for a bin float mode which reduces the speed of bin movement when the bin approaches either the minimum or maximum location. The bin float mode thereby prevents the bin from contacting the frame with a sufficient force which would otherwise damage the bin, the frame, or other mechanical and electrical components.

The automatic calibration performed by the controller 56 automatically adjusts the bin position setpoints at either end of the bin travel range. Once the setpoints are determined, the automatic calibration adjusts the range of the bin position values from bin down to bin up to correspond to the newly determined end points. The calibration is automatically performed, in one embodiment, when the operator moves the bin from the bin down position to the bin up position or from the bin up position to the bin down position, if the bin lever 52 does not include the button 54. In another embodiment, the calibration is made only when the button 54 is depressed and the bin lever 52 is between the bin down position and the bin up position. In either embodiment, the calibration is made to compensate for changes to the system caused by sensor drift or mechanical deformation, whenever the bin is moved to the extreme bin down and the extreme bin up positions. The controller 46 continuously adjusts the bin range depending on the bin position end point values received from calibration. By continuous adjustment of the bin positions using the calibrated positions, false positives of the bin alarm are reduced or prevented, bin height restrictions are avoided, engine derating is reduced or prevented, and float mode is more accurately controlled.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

The invention claimed is:

1. A method for calibrating a range of angular positions of a dump bin of a dump vehicle, the dump vehicle including control circuitry operatively connected to a bin angle, adjustment device which moves the dump bin through the range of angular positions, the bin angle adjustment device configured to have an OFF state and an ON state, an angle sensor operatively connected to the control circuitry and configured to generate a plurality of angle values indicative of the angular positions, a memory operatively connected to the control circuitry and configured to store the plurality, of angle values, and a display device operatively connected to the control circuitry, the method comprising:

determining if the angle adjustment device is in the ON state with the control circuitry;

receiving at the control circuitry the plurality of angle values generated by the angle sensor;

recording a first calibration angle in the memory, the recorded first calibration angle being determined when the angle adjustment device is in the ON state and one of the received angle values is stable over a predetermined period of time;

calibrating with the control circuitry, based on the recorded first calibration angle, a relationship between the received angle values and the range of angular positions of the dump bin; and displaying on the display device the calibrated relationship between the received angle values and the range of angular positions as a range of percentages from zero to one hundred percent on the display device.

2. The method of claim 1 further comprising determining a bin down value if the recorded first calibration angle is within a first predetermined range of sensor values.

3. The method of claim 2 further comprising recording a second calibration angle if the angle adjustment device is in the ON state and the received angle values are stable over a predetermined period of time.

4. The method of claim 3 further comprising determining a bin up value if the recorded second calibration angle is within a second predetermined range of sensor values.

5. The method of claim 4 wherein the calibrating the range of angular positions includes calibrating the range of angular values based on the recorded second calibration angle, wherein the recorded first calibration angle and the recorded second calibration angle represents endpoints of the range of percentages.

6. A method for calibrating a range of angular positions of a dump bin of a dump vehicle, the dump vehicle including control circuitry including a memory and a user interface, the control circuitry operatively connected to a big angle adjustment device, wherein the dump bin is configured to move through the range of angular positions in response to movement of the bin angle adjustment device between a first end position and a second end position, the method comprising:

monitoring the angular positions of the dump bin with the control circuitry while the dump bin moves between the first end position to the second end position in response to the bin angle adjustment device;

detecting when the angular position remains constant at one of the first end position and the second end position;

identifying with the controller a first value of the detected constant angular position at one of the first end position and the second end position;

establishing in the memory a first endpoint of the range of angular positions as a function of the identified first value; and calibrating the range of angular positions with the established first endpoint by adjusting a range of the bin position values from a bin down position to a bin up position to correspond to the first endpoint.

7. The method of claim 6 further comprising:

detecting when the angular position remains constant at the other of the first end position and the second end position;

identifying with the controller a second value of the detected other one of the first end position and the second end position;

establishing in the memory a second endpoint of the range of angular positions as a function of the identified second value; and calibrating the range of angular positions with the established second endpoint by adjusting the range of the bin position values from a bin down position to a bin up position to correspond to the second endpoint.

8. The method of claim 7 further comprising:

identifying the first value and the second value when an input provided by the bin angle adjustment device occurs at the same time as the detecting when each of the monitored first angular position and the monitored second angular position remains constant.

9. The method of claim 8 wherein the identifying the first value includes identifying the first value by comparing the first value to a range of first values.

10. The method of claim 9 wherein the identifying the second value includes identifying the second value by comparing the second value to a range of second values.

11. The method of claim 7 further comprising displaying the range of angular positions on the user interface with the first end position being determined as a function of the established first endpoint and the second end position being determined as a function of the established second endpoint.

12. The method of claim 11 wherein the displayed range at the use interface includes a plurality of displayed percentage values, wherein the established first endpoint corresponds to zero percent and the second endpoint corresponds to one-hundred percent.

13. A control system for a vehicle having a frame and a dump bin configured to angularly move in a range of angular positions with respect to the frame, the range of angular positions including a bin down position at one end of the range and a bin up position at the other end of the range, the control system comprising:

a bin angle adjustment device configured to provide a bin angle output to move the dump bin in the range of angular positions with respect to the frame;

a display configured to display values corresponding to the range of angular positions;

an angle sensor configured to provide a plurality of sensed angle values indicative of the angular positions of the dump bin with respect to the frame;

control circuitry operatively connected to: i) the bin angle adjustment device, ii) the display, and iii) the angle sensor, wherein the control circuitry is configured to move the dump bin between the bin down position to the bin up position in response to the provided bin angle output; and storage operatively connected to the control circuitry and configured to store a software component, wherein the software component is configured to determine when the sensed angle value remains constant at the same time as the bin angle adjustment device is providing the bin angle output, wherein the constant sensed angle value determines one of a down, endpoint angle value and an up endpoint angle value that determines endpoints of a range of percentages from zero percent to one hundred percent, wherein zero percent corresponds to the down endpoint angle value and one hundred percent corresponds to the up endpoint angle value.

14. The control system of claim 13 wherein the software component is further configured to compare the sensed angle value with a predetermined range of bin down values to establish the down endpoint angle value.

15. The control system of claim 14 wherein the software component is further configured to compare the sensed angle value with a predetermined range of bin up values to establish the up endpoint angle value.

16. The control system of claim 15 wherein the software component is further configured to display numeric values on the display, wherein the numeric values include zero percent, 100 hundred percent, and values therebetween.

17. The control system of claim 16 wherein the software component is further configured to assign the displayed numeric values to the sensed angle values as a function of the established down endpoint angle value and the established up endpoint angle value.

18. The control system of claim 17 wherein the plurality of sensed angle values provided by the angle sensor corresponds to an electrical range of values having a minimum value and a maximum value.

19. The control system of claim 18 wherein the predetermined range of bin down values corresponds to about ten percent of the range of electrical values between the minimum value and the maximum value.

20. The control system of claim 19 wherein the predetermined range of bin up values corresponds to about ten percent of the range of electrical values between the minimum value and the maximum value.

* * * * *